United States Patent
Bergelin et al.

(10) Patent No.: US 8,935,899 B2
(45) Date of Patent: Jan. 20, 2015

(54) LAMELLA CORE AND A METHOD FOR PRODUCING IT

(71) Applicant: Välinge Innovation AB, Viken (SE)

(72) Inventors: Marcus Bergelin, Lerberget (SE); Darko Pervan, Viken (SE); Hans Brännström, Höganäs (SE); Agne Pålsson, Hasslarp (SE)

(73) Assignee: Valinge Innovation AB, Viken (SE)

( * ) Notice: Subject to any disclaimer, the term of this patent is extended or adjusted under 35 U.S.C. 154(b) by 0 days.

(21) Appl. No.: 13/738,401

(22) Filed: Jan. 10, 2013

(65) Prior Publication Data

US 2013/0199120 A1    Aug. 8, 2013

Related U.S. Application Data

(60) Provisional application No. 61/594,059, filed on Feb. 2, 2012.

(51) Int. Cl.
*E04B 2/00* (2006.01)
*E04B 5/00* (2006.01)
*B32B 38/00* (2006.01)
*B27M 3/00* (2006.01)
(Continued)

(52) U.S. Cl.
CPC ............... *E04B 5/00* (2013.01); *B32B 38/0004* (2013.01); *B27M 3/0026* (2013.01); *B27M 3/04* (2013.01); *E04C 2/36* (2013.01); *B27D 1/06* (2013.01); *B32B 21/13* (2013.01); *E04C 3/16* (2013.01); *E04C 2/12* (2013.01); *E04F 15/045* (2013.01)

USPC .......... 52/588.1; 52/578; 52/589.1; 52/592.1; 52/592.4

(58) Field of Classification Search
CPC ......... E04F 15/02; E04F 15/04; E04F 15/048; E04F 15/046; E04F 15/107; E04C 2/36; E04C 2/34; B27M 3/006; B32B 21/00
USPC ................ 52/588.1, 592.1, 592.4, 589.1, 578
See application file for complete search history.

(56) References Cited

U.S. PATENT DOCUMENTS

| 1,925,068 A | 8/1933 | Gray |
| 1,995,264 A | 3/1935 | Mason |

(Continued)

FOREIGN PATENT DOCUMENTS

| CA | 430631 A | 10/1945 |
| CA | 2 463 192 A1 | 10/2005 |

(Continued)

OTHER PUBLICATIONS

Pervan, Darko, et al., U.S. Appl. No. 13/870,224, entitled "Building Panels of Solid Wood," filed Apr. 25, 2013.

(Continued)

*Primary Examiner* — Brian Glessner
*Assistant Examiner* — Joshua Ihezie
(74) *Attorney, Agent, or Firm* — Buchanan Ingersoll & Rooney P.C.

(57) ABSTRACT

The disclosure relates to a semi product for building panels or structural elements comprising several wood lamellas (5) fixed by distance elements (4), a building panel with such a semi product and a method of producing the semi product and the building panel.

24 Claims, 11 Drawing Sheets

(51) Int. Cl.
*B27M 3/04* (2006.01)
*E04C 2/36* (2006.01)
*B27D 1/06* (2006.01)
*B32B 21/13* (2006.01)
*E04C 3/16* (2006.01)
*E04C 2/12* (2006.01)
*E04F 15/04* (2006.01)

(56) References Cited

U.S. PATENT DOCUMENTS

| | | | |
|---|---|---|---|
| 2,026,511 A | 12/1935 | Storm | |
| 2,113,076 A | 4/1938 | Bruce | |
| 2,141,708 A | 12/1938 | Elmendorf | |
| 2,149,026 A | 2/1939 | McBride | |
| 2,269,926 A | 1/1942 | Crooks | |
| 2,706,164 A * | 4/1955 | Hervey | 428/106 |
| 2,740,167 A | 4/1956 | Rowley | |
| 2,826,521 A * | 3/1958 | Robinson | 428/110 |
| 2,914,815 A | 12/1959 | Alexander | |
| 3,234,074 A | 2/1966 | Bryant | |
| 3,333,384 A * | 8/1967 | Brady | 52/557 |
| 3,363,378 A * | 1/1968 | Palfey | 52/309.2 |
| 3,440,790 A | 4/1969 | Nerem | |
| 3,488,904 A * | 1/1970 | Dawdy et al. | 52/241 |
| 3,548,559 A | 12/1970 | Levine | |
| 3,888,061 A | 6/1975 | Kahr | |
| 4,093,762 A * | 6/1978 | Kiefer | 428/55 |
| RE30,233 E | 3/1980 | Lane et al. | |
| 4,242,390 A | 12/1980 | Nemeth | |
| 4,471,012 A | 9/1984 | Maxwell | |
| 4,646,494 A | 3/1987 | Saarinen et al. | |
| 4,694,627 A | 9/1987 | Omholt | |
| 4,716,700 A | 1/1988 | Hagemeyer | |
| 4,807,416 A | 2/1989 | Parasin | |
| 4,937,122 A * | 6/1990 | Talbert | 428/68 |
| 5,040,582 A | 8/1991 | Hsu | |
| 5,098,762 A * | 3/1992 | Nakajima | 428/106 |
| 5,103,614 A * | 4/1992 | Kawaguchi et al. | 52/392 |
| 5,349,796 A | 9/1994 | Meyerson | |
| 5,497,589 A | 3/1996 | Porter | |
| 5,540,025 A | 7/1996 | Takehara | |
| 5,755,068 A | 5/1998 | Ormiston | |
| 5,776,580 A * | 7/1998 | Rasmussen et al. | 428/74 |
| 5,879,781 A * | 3/1999 | Mehta et al. | 428/137 |
| 5,899,038 A | 5/1999 | Stroppiana | |
| 5,900,099 A | 5/1999 | Sweet et al. | |
| 5,968,625 A | 10/1999 | Hudson | |
| 6,006,486 A | 12/1999 | Moriau et al. | |
| 6,182,413 B1 * | 2/2001 | Magnusson | 52/589.1 |
| 6,209,278 B1 | 4/2001 | Tychsen | |
| 6,212,838 B1 | 4/2001 | Eda | |
| 6,247,285 B1 | 6/2001 | Moebus | |
| 6,314,759 B1 * | 11/2001 | Nihashi | 65/43 |
| 6,332,733 B1 | 12/2001 | Hamberger et al. | |
| 6,505,452 B1 | 1/2003 | Hannig et al. | |
| 6,546,691 B2 | 4/2003 | Leopolder | |
| 6,591,568 B1 | 7/2003 | Palsson | |
| 6,606,834 B2 * | 8/2003 | Martensson et al. | 52/578 |
| 6,676,199 B2 | 1/2004 | Buisson et al. | |
| 6,679,011 B2 | 1/2004 | Beck et al. | |
| 6,722,809 B2 | 4/2004 | Hamberger et al. | |
| 6,769,218 B2 * | 8/2004 | Pervan | 52/591.4 |
| 6,786,019 B2 | 9/2004 | Thiers | |
| 6,804,926 B1 | 10/2004 | Eisermann | |
| 6,933,043 B1 | 8/2005 | Son et al. | |
| 6,953,105 B2 * | 10/2005 | Rust et al. | 181/293 |
| 7,021,346 B2 * | 4/2006 | Chang | 144/333 |
| 7,506,481 B2 * | 3/2009 | Grafenauer | 52/592.1 |
| 7,665,263 B2 | 2/2010 | Yau | |
| 7,971,401 B2 * | 7/2011 | Preiss | 52/204.2 |
| 7,993,731 B2 | 8/2011 | Miller et al. | |
| 8,029,880 B2 * | 10/2011 | Liu | 428/60 |
| 8,061,104 B2 * | 11/2011 | Pervan | 52/592.1 |
| 8,209,841 B2 * | 7/2012 | Kanade et al. | 29/428 |
| 8,245,477 B2 | 8/2012 | Pervan | |
| 8,381,488 B2 | 2/2013 | Pervan | |
| 8,418,427 B2 * | 4/2013 | Strickland et al. | 52/742.13 |
| 2002/0059765 A1 | 5/2002 | Nogueira et al. | |
| 2003/0010434 A1 * | 1/2003 | Grenier | 156/264 |
| 2003/0033777 A1 | 2/2003 | Thiers et al. | |
| 2003/0233809 A1 * | 12/2003 | Pervan | 52/783.1 |
| 2004/0226243 A1 | 11/2004 | Lin et al. | |
| 2005/0069674 A1 * | 3/2005 | Chang | 428/106 |
| 2005/0123728 A1 | 6/2005 | Reichwein et al. | |
| 2005/0208255 A1 | 9/2005 | Pervan | |
| 2006/0154015 A1 | 7/2006 | Miller et al. | |
| 2007/0151189 A1 | 7/2007 | Yang | |
| 2007/0292656 A1 * | 12/2007 | Handojo | 428/106 |
| 2008/0008871 A1 | 1/2008 | Pervan | |
| 2008/0028707 A1 | 2/2008 | Pervan | |
| 2008/0184647 A1 | 8/2008 | Yau | |
| 2008/0199676 A1 | 8/2008 | Bathelier et al. | |
| 2010/0247861 A1 | 9/2010 | Mitchell | |
| 2010/0281810 A1 | 11/2010 | Ruland | |
| 2010/0297380 A1 * | 11/2010 | Szakola et al. | 428/56 |
| 2010/0300030 A1 | 12/2010 | Pervan et al. | |
| 2011/0023405 A1 * | 2/2011 | Moriau et al. | 52/588.1 |
| 2011/0154763 A1 | 6/2011 | Bergelin et al. | |
| 2012/0015131 A1 * | 1/2012 | Akarsu et al. | 428/54 |
| 2012/0042595 A1 * | 2/2012 | De Boe | 52/309.13 |
| 2013/0047536 A1 | 2/2013 | Pervan | |
| 2013/0145707 A1 | 6/2013 | Pervan | |

FOREIGN PATENT DOCUMENTS

| | | |
|---|---|---|
| CH | 173818 | 12/1934 |
| CH | 310904 | 11/1955 |
| CN | 2401633 Y | 10/2000 |
| DE | 908 913 C1 | 4/1954 |
| DE | 2 205 232 A1 | 8/1973 |
| DE | 33 43 601 A1 | 6/1985 |
| DE | 33 43 601 C2 | 6/1985 |
| DE | 43 13 037 C1 | 8/1994 |
| DE | 201 08 358 U1 | 9/2001 |
| DE | 100 49 172 A1 | 4/2002 |
| EP | 0 652 340 A1 | 5/1995 |
| EP | 1 262 609 A1 | 12/2002 |
| FI | 21805 | 1/1947 |
| FR | 1.464.112 | 7/1966 |
| FR | 2 718 175 A1 | 10/1995 |
| GB | 291113 | 11/1928 |
| GB | 519198 | 3/1940 |
| JP | 2-194269 A | 7/1990 |
| JP | 2-121236 U | 10/1990 |
| JP | 5-21027 U | 3/1993 |
| JP | 6-158831 A | 6/1994 |
| JP | 6-280376 A | 10/1994 |
| JP | 7-102745 A | 4/1995 |
| JP | 7-310426 A | 11/1995 |
| JP | 8-021071 A | 1/1996 |
| JP | 8-068191 A | 3/1996 |
| JP | 8-300316 A | 11/1996 |
| JP | 9-38906 A | 2/1997 |
| JP | 10-299230 A | 11/1998 |
| JP | 11-324292 A | 11/1999 |
| JP | 2000-027418 A | 1/2000 |
| JP | 2000-226932 A | 8/2000 |
| JP | 2000-265652 A | 9/2000 |
| JP | 2001-145980 A | 5/2001 |
| JP | 2001-329681 A | 11/2001 |
| JP | 2003-027731 A | 1/2003 |
| JP | 2003-080509 A | 3/2003 |
| KR | 2007-0000322 A | 1/2007 |
| NL | 1008945 C1 | 10/1999 |
| WO | WO 94/26999 A1 | 11/1994 |
| WO | WO 96/27719 A1 | 9/1996 |
| WO | WO 96/27721 A1 | 9/1996 |
| WO | WO 97/38187 A1 | 10/1997 |
| WO | WO 97/47834 A1 | 12/1997 |
| WO | WO 99/05073 A1 | 2/1999 |
| WO | WO 99/66152 A1 | 12/1999 |
| WO | WO 00/66856 A1 | 11/2000 |
| WO | WO 01/54897 A1 | 8/2001 |

(56) References Cited

FOREIGN PATENT DOCUMENTS

| WO | WO 03/016655 A1 | 2/2003 |
|---|---|---|
| WO | WO 03/087498 A1 | 10/2003 |
| WO | WO 2004/108373 A1 | 12/2004 |
| WO | WO 2006/027357 A1 | 3/2006 |
| WO | WO 2006/043893 A1 | 4/2006 |
| WO | WO 2006/134109 A1 | 12/2006 |
| WO | WO 2007/149051 A1 | 12/2007 |
| WO | WO 2009/065769 A2 | 5/2009 |
| WO | WO 2009/065769 A3 | 5/2009 |

OTHER PUBLICATIONS

Pervan, Darko, U.S. Appl. No. 13/932,406, entitled "Panel Forming," filed Jul. 1, 2013.
U.S. Appl. No. 13/758,400, Pervan.
U.S. Appl. No. 61/667,290, Pervan.
Pervan, Darko, U.S. Appl. No. 13/758,400 entitled "Floorboards for Floorings," filed Feb. 4, 2013.
Pervan, Darko, U.S. Appl. No. 61/667,190 entitled "Panel Forming," filed Jul. 2, 2012.
International Search Report issued in PCT/SE2013/050010, mailed Jun. 5, 2013, Patent-och registreringsverket, Stockholm, SE, 7 pages.
Pervan, Darko (Author)/Valinge Innovation, Technical Disclosure entitled "VA073a Zip Loc," Sep. 13, 2011, IP.com No. IPCOM000210869D, IP.com PriorArtDatabase, 36 pages.
Pervan, Darko, U.S. Appl. No. 14/248,018 entitled "Floorboards for Floorings," filed Apr. 8, 2014.
Bräannström, Hans, et al., U.S. Appl. No. 14/468,763 entitled "A Method for Producing a Lamella Core," filed in the U.S. Patent and Trademark Office on Aug. 26, 2014.
U.S. Appl. No 14/468,763, Brännström, et al.

* cited by examiner

LAMELLA CORE AND A METHOD FOR PRODUCING IT

CROSS REFERENCE TO RELATED APPLICATIONS

The present application claims the benefit of U.S. Provisional Application No. 61/594,059, filed on Feb. 2, 2012. The entire contents of U.S. Provisional Application No. 61/594,059 are hereby incorporated herein by reference in their entirety.

TECHNICAL FIELD

The disclosure generally relates to the field of cores comprising several wood lamellas and building panels, e.g. floor and wall panels, comprising such a core, a decorative surface layer and a balancing. Furthermore, the disclosure relates to production methods to produce such cores and panels. Also disclosed is a structural element, such as a beam, comprising wood lamellas.

BACKGROUND

It is well known to produce building panels, e.g. floor panels, comprising a wood lamella core, see e.g. CA 430 631. It is also well known to produce building panels with a mechanical locking system, see e.g. WO 1994/026999.

An engineered wood floor generally comprises of a surface layer, a core layer and a balancing layer. The core provides stability and counteracts swelling/shrinking. Several core materials may be used such as plywood, HDF boards or a lamella core comprising several wood lamellas.

SUMMARY OF THE INVENTION

An overall objective of the invention is to improve the yield of the production of a wood lamella core for building panels, particular panels comprising a mechanical locking system. The mechanical locking system may be provided on long and/or short edges that may be locked with various combinations of angling and vertical or horizontal snapping. A specific objective is to improve the locking system, especially when such system is formed in a wood core.

The material used for wood lamella cores is due to cost reasons normally of low grade with a high number of knots, cracks etc. Furthermore the incoming material is in different lengths and the lengths seldom correspond to the exact length needed in the production. This causes a material waste in the production of the wood lamella core. The invention increases the share of the incoming material that is possible to use in the production of building panels with a wood lamella core.

A first aspect of the invention is a semi-product for a structural element, such as a beam, or for a core for a building panel. The semi product comprising several wood lamellas, which are arranged essentially parallel to each other and with long edge to long edge. A long edge of a first wood lamella is fixed to a long edge of an adjacent second wood lamella by a fastening element, preferably an adhesive and/or a distance element. The long edge of the first wood lamella is preferably fixed by at least two fastening elements to the long edge of the adjacent second wood lamella. The fastening elements secure the wood lamellas in the semi-product, which makes it possible to use lower grade material with cracks or knots and/or with different lengths. This increases the surface area of core material produced per incoming volume.

The semi product is easier to handle in the production than the separate and loose wood lamellas known in the art. The invention also makes it easier to control the total length of the wood lamella core. The piece of a semi product, which is cut away to adjust the total length of the semi products to the length of a wood lamella core of a building panel, may be used in another wood lamella core.

The fastening elements furthermore assure a defined position between the wood lamellas. If the position of the wood lamellas is not fixed and the wood lamellas can be displaced easily and randomly in the process, as is the case with known technology, the result may be a few large openings, which causes a downgrading and/or may require a manual correction of large gaps.

In the production of a wood lamella building panel, with a mechanical locking system at long and short edge, normally the wood lamella core has to be replaced at the short edges with a short edge core material, which is more homogeneous, stronger and consequently more expensive than the wood lamella core. The invention makes it easier to control the total length of the wood lamella core, thus enabling the use of a smaller piece for the short edge material.

The fastening element may be an adhesive which may be e.g. a bridge adhesive, a building adhesive, an expanding adhesive or a self-foaming glue such as PU-adhesive. The adhesive may be a hot melt adhesive applied with a foaming unit.

The distance elements may comprise wood fibres and said distance elements may be fixed to the first wood lamella and the adjacent second wood lamella by an adhesive, such as resins, preferably cross-linked, hot melt glue, white glue or glue comprising polyvinyl acetate or polyurethane. The distance elements may alternatively comprise veneer, recycled parts of wood lamellas, paper, MDF, HDF, OSB, saw dust mixed with resin, or resin with a filler.

The distance between the long edge of the first wood lamella and the long edge of the adjacent second wood lamella in the core for the building panel may be in the range of about 0.5 mm to about 15 mm, preferably in the range of about 1 mm to about 5 mm generally depending among other things on the thickness of the surface layer that must over-bridge the distance between the wood lamellas.

The first or the second wood lamella may comprise in its length direction two pieces spaced from each other by a space at short edges of said pieces, since the distance element secures the pieces in the semi product.

The space may be arranged at one of the distance elements, in order to makes the semi-product even stronger.

An enforcement element may be arranged at the space or at a knot or other weakness of a wood lamella, in order to further increase the strength of the semi-product.

A part of the distance element may be positioned in a groove in the first wood lamella.

Another part of the distance element may be positioned in another groove in the second wood lamella.

A third wood lamella may be fixed to a second wood lamella by a second distance element, a fourth wood lamella may be fixed to the third wood lamella by a third distance element, wherein the distance element, the second distance element and the third distance element are preferably arranged in a straight line.

The straight line may be oriented at about 45 degrees to the longitudinal direction of the first wood lamella.

The outer long edge of the outermost wood lamella may be provided with distance elements. If several semi products are arranged next to each in the production of a building panel the distance between adjacent semi-products is secured.

The cavity between two adjacent wood lamellas may be filled with sound reducing material or insulating material.

A second aspect of the invention is a method of producing a semi-product, preferably the semi-product for a core for a building panel according to the first aspect, wherein the method comprises the steps of:
- applying a fastening element, preferably at least two distance strips, at a distance essentially equal to the width of the ready building panel, and an adhesive, the strips are preferably arranged essentially perpendicular to the first wood board;
- attaching a second wood board to said first wood board by said fastening element, preferably by applying an adhesive, and thereby obtaining a batch comprising the first and the second wood board and the distance strip; and
- cutting said batch in the length direction of the wood boards, preferably by a multi rip saw, a frame saw or a band saw.

The method may comprise the step of adding further wood boards and fastening elements, preferably distance strips, to said batch by attaching several wood boards to the second and/or the first wood board and preferably at least two distance strips between adjacent wood boards.

A preferred batch comprises at least three wood boards and the cutting is made by a band saw or a frame saw.

The method may comprise the step of arranging the distance strips between adjacent wood boards in a straight line.

The straight line may be oriented at about 90 degrees to the longitudinal direction of the first wood board.

The method may also be used to produce a semi-product for a structural element, preferably according to the sixth aspect, such as a beam, wherein the straight line is preferably oriented at about 45 degrees to the longitudinal direction of the first wood board.

The method may comprise the step of cutting the first and the second wood boards and the distance strips in a direction perpendicular to the length direction.

If the wood boards are cup shaped the method preferably comprises the steps of:
- forming two grooves, preferably with essentially planar fixation surfaces, in a surface of the first wood board; and
- attaching one of said two distance strips in each groove.

If the wood boards are cup shaped the method preferably also comprises the steps of:
- forming two grooves, preferably with essentially planar fixation surfaces, in a surface of the second wood board; and
- attaching one of said two distance strips in each of said grooves in the surface of the second wood board.

By forming grooves in the first and the second wood boards planar surfaces are provided for attaching the strips. This has the effect that the fixation strength between the strips and the wood boards are increased.

The method may comprise the step of cutting the first and the second wood board and the distance strips in the length direction several times with a distance between the cuts which is equal to the thickness of the a semi-product.

A third aspect of the invention is a building panel comprising a wood lamella core comprising the semi product according to the first aspect, a decorative surface layer on top of the core and balancing layer under the core. The building panel may be provided with a mechanical locking system along its long edges and the distance elements are preferably arranged at the long edges at the mechanical locking system. This makes the locking system stronger and delimits the risk for tearing out parts, splinters or chips of the wood lamellas at the edge, especially at the locking element, during the profiling operation. Tearing out parts, splinters or chips of the wood lamellas at the edge is negative for the strength of the mechanical locking system and for the quality impression. The openings at the edge, if not closed by the distance elements, may also carry a lot of splinters and dust from the profiling operation. Later, this can cause indentation marks when the ready boards are packed.

A forth aspect of the invention is a building panel, such as a floorboard, comprising a wood lamella core, a decorative surface layer on top of the core and balancing layer under the core. The core comprises several wood lamellas, which are arranged essentially parallel to each other and with long edge to long edge. A long edge of a first wood lamella is arranged with a distance to a long edge of an adjacent second wood lamella. The long edge of the first wood lamella is fixed by a distance element to the long edge of the adjacent second wood lamella and at a first edge of the building panel. A first mechanical locking device is formed at the first edge of the building panel and at least partly in the distance elements. This makes the first mechanical locking system stronger and delimits the risk for tearing out parts, splinters or chips of the wood lamellas at the edge when the first mechanical locking device is formed, preferably by milling. Tearing out parts, splinters or chips of the wood lamellas at the edge is negative for the strength of the first mechanical locking device and for the quality impression. The openings at the edge, if not closed by the distance elements, may also carry a lot of splinters and dust from the profiling operation. Later, this can cause indentation marks when the ready building panels are packed.

Preferably, the long edge of the first wood lamella is fixed by a second distance element to the long edge of the adjacent second wood lamella and at a second opposite edge of the building panel, wherein the distance element and the second distance element are arranged at a distance, preferably with a cavity in between.

A part of the distance element may be positioned in a first groove in the first wood lamella, and a part of the second distance element is positioned in a second groove in the first wood lamella in order to improve the fixation to the first wood lamella.

Preferably another part of the distance element and the second distance element are positioned in a third and a fourth groove, respectively, in the second wood lamella.

A second mechanical locking device may be formed at the second opposite edge of the building panel and at least partly in the second distance elements.

The distance element may extends to a second opposite edge of the building panel, wherein a second mechanical locking device may be formed at the second opposite edge of the building panel and at least partly in the distance elements.

The first mechanical locking device may be configured to cooperate with the second mechanical locking device at an essential identical building panel for vertical and/or horizontal locking of the building panel and the essential identical building panel.

The second locking device may comprise a locking groove at the second opposite edge of the groove panel.

The first locking device may comprise a protruding strip with a locking element. The protruding strip is enforced by the distance element between the wood lamellas.

The locking element and the locking groove are configured to cooperate for the locking in the horizontal direction.

The first or the second locking device may comprises a tongue and the other of the first or the second locking device may comprises a tongue groove, wherein the tongue and the tongue groove are configured to cooperate for the locking in the vertical direction.

The distance element may be of a different material or of different properties, e.g. different wood species and/or wood with different wood fibre directions, than the wood lamellas.

The wood lamella core preferably comprises several semi products according to the first aspect.

A fifth aspect of the invention is a method for producing a building panel according to the third aspect. The method comprising the steps of:
- arranging several semi-products next to each other, with an outer wood lamella of each semi product adjacent an outer wood lamella of an adjacent semi-product;
- positioning the balancing layer on a first side of the semi-products, preferably essentially perpendicular to the longitudinal direction of the wood lamellas of the semi-products;
- arranging the decorative layer on a second side of the semi-products, preferably essentially perpendicular to the longitudinal direction of the wood lamellas of the semi-products; and
- cross cutting the semi-products along an edge of the decorative layer, preferably at the distance elements and even more preferably through the distance elements.

The method may comprise the step of producing a mechanical locking system along the long edges of the decorative layer in the wood lamella core.

The method may comprise the step of arranging a core material of different material, e.g. a piece of plywood at a short edge of the decorative layer, and preferably producing a mechanical locking system along the short edge of the decorative layer and in the core material of different material.

The method may comprise the step of arranging a distance element between two adjacent semi-products between the outer most wood lamellas of said two adjacent semi-products.

The method may also be used to produce the building panel according to the forth aspect, wherein the locking system comprises the first locking device along a first long edge and the second locking device along a second long edge.

A sixth aspect of the invention is a structural element, such as a beam, comprising a web of wood lamellas. The web comprises a first layer comprising wood lamellas and a second layer comprising wood lamellas. The first layer is arranged such that the length direction of at least some of the wood lamellas is oriented essentially perpendicular to the length direction of at least some of the wood lamellas in the second layer.

Preferably, essentially all wood lamellas in the first layer are arranged perpendicular to essentially all wood lamellas in second layer.

By arranging the first and the second layer such that the wood lamellas in the first layer are essentially perpendicular to the wood lamella in the second layer the strength of the structural element is increased.

To minimize the weight of the structural element the width of the distance element are preferably wider than the width of the wood lamellas.

A first wood lamella in the first layer may be fixed to a second wood lamella in the first layer by a distance element.

A first wood lamella in the second layer may be fixed to a second wood lamella in the second layer by a distance element.

The first layer may be fixed to the second layer, preferably by gluing at some of the distance elements and/or at a crossing of the first and the second layer.

A preferred embodiment is a beam comprising a first flange, attached to ends of the wood lamellas in the first and a second layer, and a second flange, attached to opposite end of the wood lamellas.

The beam may have some wood lamellas, which are arranged perpendicular to the first and the second flange, preferably at the longitudinal ends of the beam.

A seventh aspect of the invention is a set of rectangular building panel with a surface layer, a core and a long edge locking system. The locking system comprising a tongue and a groove for vertical locking of adjacent edges and a protruding strip with a locking element at a first edge that cooperates with a locking groove at a second adjacent edge for horizontal locking of the adjacent edges. The protruding strip comprises several sections along the joint. Said sections have different widths in the length direction of the joint and/or different material properties, e.g. different wood species and/or wood with different wood fibre directions.

The rectangular building panel may comprise a wood lamella core with lamellas that are spaced from each other in an inner part of the core.

An eighth aspect of the invention is a building panel with a surface layer and a multi-layer wood lamella core wherein the core consists of two sets of wood lamellas, an upper set attached to the surface layer and a lower set attached to the upper set, wherein each set comprises wood lamellas spaced from each other in a main plane of the panel.

The average distance between the lamellas in the lower set may be larger than the average distance between the lamellas in the upper set.

The building panel may comprise lamellas that are attached to each other with distances.

BRIEF DESCRIPTION OF THE DRAWINGS

The invention will in the following be described in connection to preferred embodiments and in greater detail with reference to the appended exemplary drawings, wherein.

DETAILED DESCRIPTION OF EMBODIMENTS

Figure 1A:
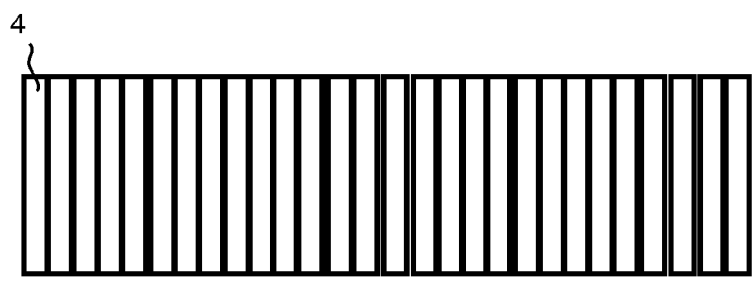
FIGS. 1a-c show the production of a wood lamella core according to known technology.

In the production of a building panel, e.g. a floor panel, with a wood lamella core it is known to arrange wood lamellas 4 parallel to each other and with a small distance between the wood lamellas as is shown in FIG. 1a. The distance is undefined and random. A surface layer 6 is applied and glued to the wood lamellas 4. The fibres in the wood lamella core are generally oriented perpendicular to the fibre direction of the surface layer 6. This provides a very climate stable floor panel when the surface layer is glued to the lamella core.

Figure 1B:
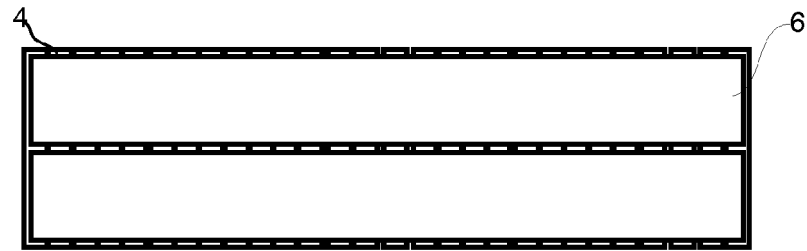
Figure 1C:
Figure 1D:
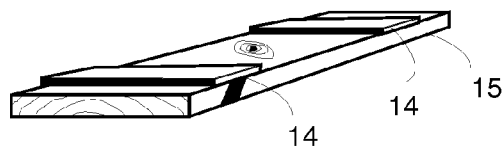
FIGS. 1d-e illustrate a wood board and a batch comprising several wood boards and distance strips according to an embodiment of the invention.

Generally the wood lamellas 4 have a length, which is equal to the width of two or several floor panels as is shown in FIG. 1b. The wood lamellas 4 are, after gluing of the surface layer 6, crosscut along a long edge of a surface layer to obtain the building panel, see FIG. 1c.

Figure 1E:
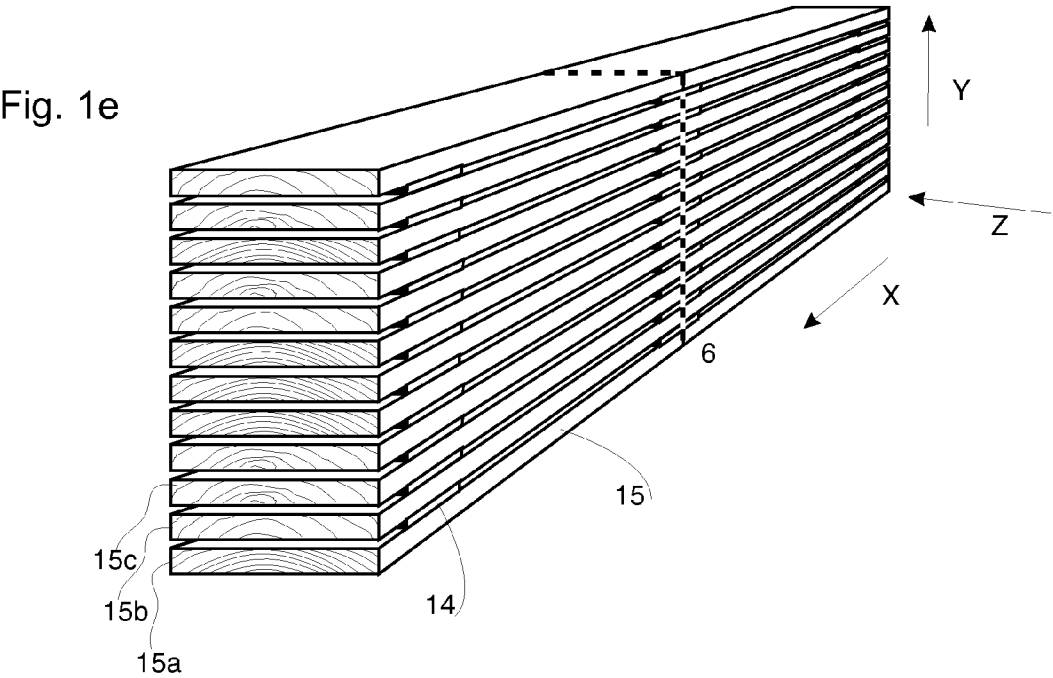

A batch according to an embodiment of the invention comprising wood boards 15 and distance strips 14 are shown in FIG. 1e. The wood boards 15 may be piled vertically above each other, with a distance strip 14, preferably of wood, between adjacent wood boards, as shown in FIGS. 1a and 1b, or arranged in the same way in the horizontal direction. The distance strips 14, between, a first 15a and a second 15b, and, a second and a third 15c, adjacent wood boards, are preferably arranged vertically aligned. The wood species of the wood boards and/or the distance strips may be, e.g., spruce, pine rubber wood or poplar.

Figure 2:
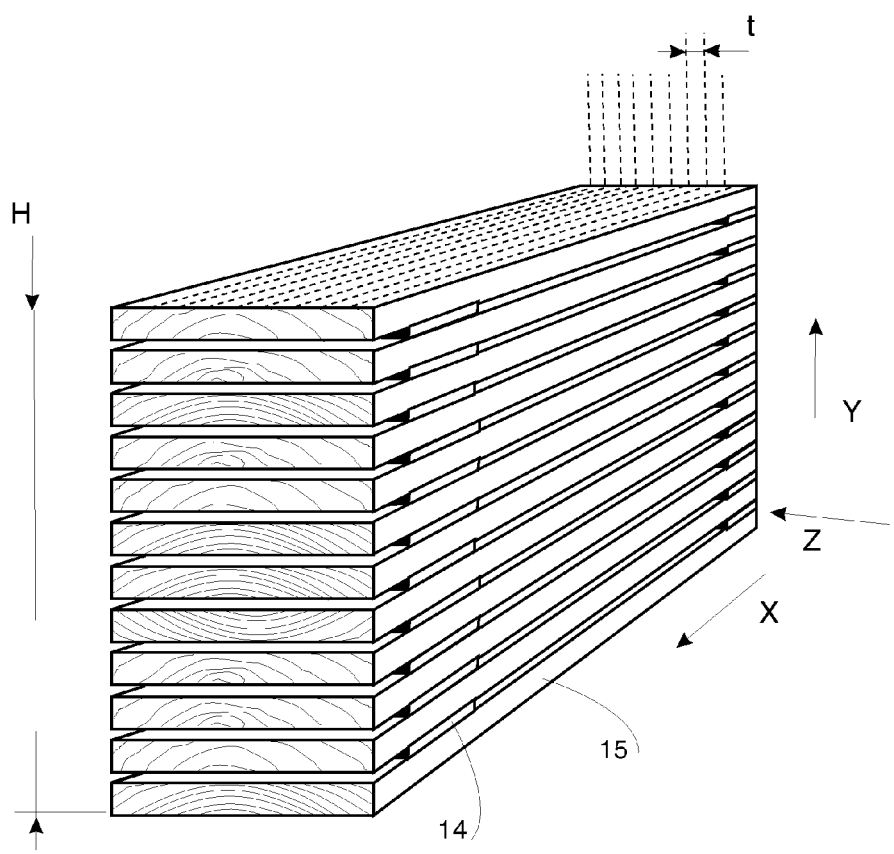
FIG. 2 illustrates a batch comprising several wood boards according to an embodiment of the invention.

The wood boards are preferably arranged such that the annual rings are oriented in the same way, see FIG. 1e, and not opposite to each other, see FIG. 2. Different orientation of the annuals rings may cause the wood boards in the batch to crack and/or separate since the wood boards are cupping, due to humidity changes, in different direction. The cupping may be decreased by having narrower wood boards. The wood boards are preferably divided into a width, which correspond to a multiple of the thickness of desired wood lamellas plus the width of any saw cut(s) between the wood lamella layers.

Figure 3A:
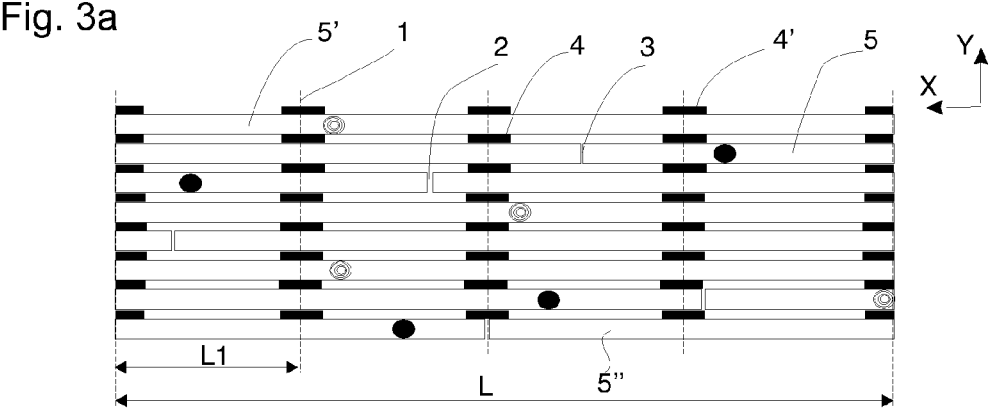
FIGS. 3a-3b illustrate a semi product according to an embodiment of the invention.
Figure 3B:
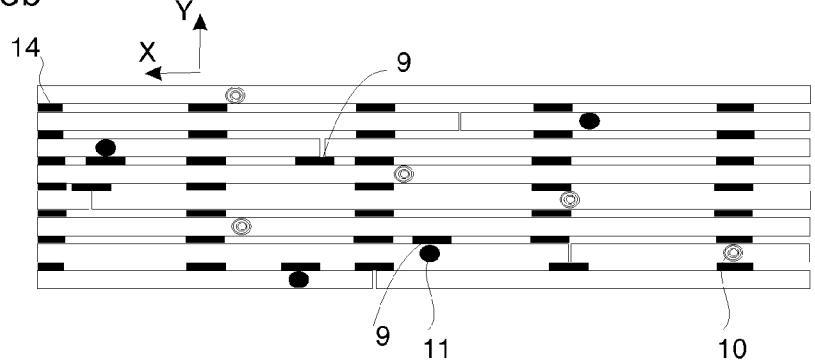

The batch may be used for producing a semi product, see FIGS. 3a and 3b. The semi product may be used in a lamella wood core intended of a building panel, see FIGS. 3c and 4b.

Each distance strip 14 is fixed to the adjacent(s) wood boards 15 by an adhesive, e.g., such as resins, preferably cross-linked, hot melt glue, white glue, glue comprising polyvinyl acetate or polyurethane or expanding/foaming glue. The longitudinal direction Z of the distance strips 14 is preferably perpendicular to the longitudinal direction X of the wood boards 15.

The wood boards are divided several times by cutting in its longitudinal direction X, forming a wood lamella 5, 5', 5" of the semi product, as shown in FIG. 3a, and the distance strip is in the same cutting cross cut, forming a distance element 4, 4' of the semi product.

The distance t between two adjacent cuts corresponds essentially to the thickness of the semi-product and thickness of the wood lamellas. The distance L1, in the longitudinal direction of the wood lamellas X, between two adjacent distance elements 4, corresponds preferably to the width of a ready-made building panel, see FIG. 3a. The total length L of the semi-product, in the longitudinal direction of the wood lamellas X, is preferably essentially equal to a multiple of the width, including any mechanical locking system, of a ready-made building panel.

Knots 10 or other weaknesses 11 of the wood lamellas in the semi product are preferably enforced with an enforcement element 9, if they are not positioned at a distance element 4. The wood lamella may comprise two pieces of wood in the longitudinal direction. The short edges of two adjacent pieces may be close to each other 3 or positioned at some distance 2. The short edges close to each other may be glued to each other and the short edges positioned at some distance may be provided with an enforcement element 9. The short edges of said two adjacent pieces may also be positioned at a distance element 4. The wood lamellas are preferably arranged such that short edges of a first wood lamella, with short edges between a pair of adjacent distance element, is not positioned next to a second wood lamella with short edges positioned in the longitudinal direction X between said pair of distance element of the second wood lamella.

A wood lamella 5' at the outer edge of the semi product may be provided with a distance element 4'. The purpose with this distance element 4' is to position a first semi product at the desired distance from a second semi product when the first and the second semi product is arranged next to each other, see FIGS. 3a and 4a.

Figure 3C:
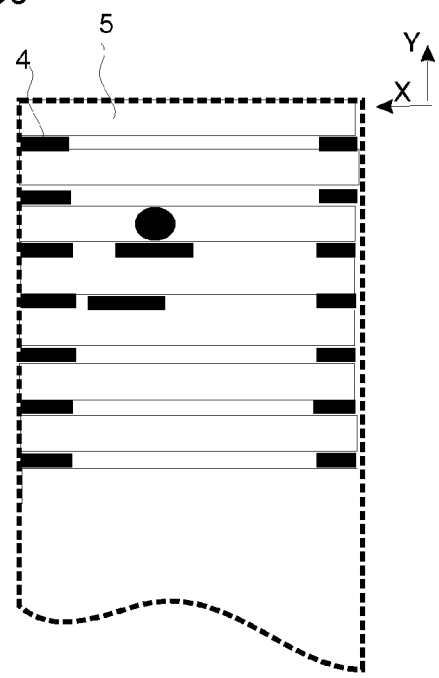
FIGS. 3c-d illustrate a building panel according to an embodiment of the invention
Figure 3D:
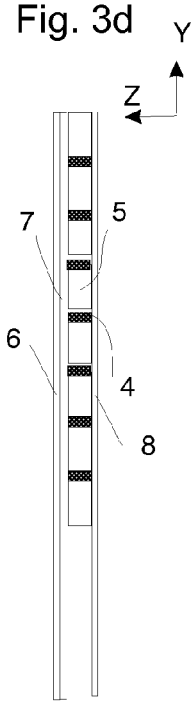

FIGS. 3c and 3d disclose a building panel, preferably a floor panel, with a core comprising the semi products described above (section L1 in FIG. 3a). The building panel is shown from above FIG. 3c and in a side view 3d. The building panel further comprises a surface layer 6, preferably comprising wood or a wood veneer, and a balancing layer 8. Optionally the building panel may comprise a supporting layer 7, e.g. a thin board or a veneer, in order to avoid telegraphing in top surface of the decorative layer 6. At the same time the thickness of surface layer 6 can be reduced.

Figure 4A:
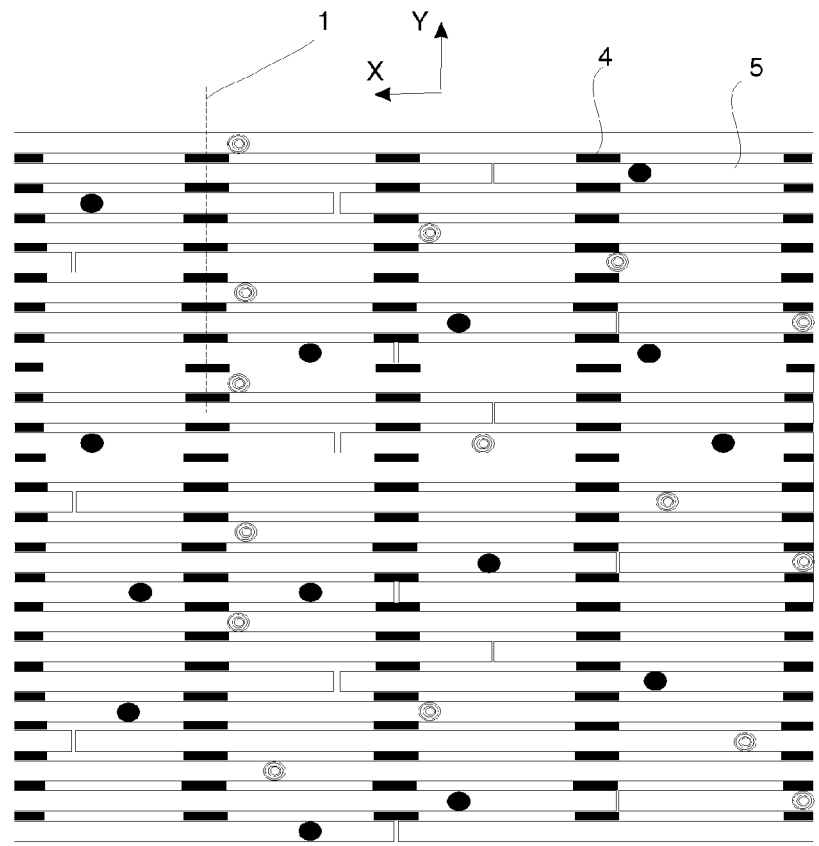
FIGS. 4a-4b illustrate several semi product adjacent each other and a building panel respectively according to an embodiments of the invention.
Figure 4B:
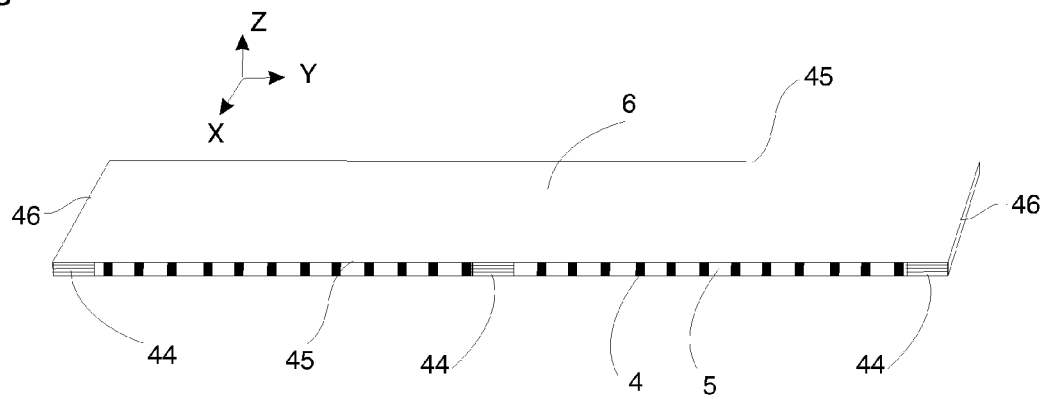

FIG. 4a discloses several semi-products arranged in a set long side to long side to be used as an element for the production of building panels, see FIG. 4b. In the production of building panels several decorative layers 6 may be positioned on one side of said set, preferably with their longitudinal direction perpendicular to the longitudinal direction of the wood lamellas 5 of the semi products. The length of the set, in a direction Y perpendicular to the longitudinal direction of the wood lamellas 5 in the semi products, is preferably about the same as the length of a ready-made building panel.

A long edge 45 of a decorative layer 6 may be arranged along a line 1 of distance elements 4. A balancing layer 8 may be arranged on the other side of the set at each position of a decorative layer 6. The set is preferably cut along said line 1 and a mechanical locking system formed along the long edges of the building panel.

A core material of different material 44, e.g. a piece of plywood, may be positioned in the set at a position, which corresponds to a short edge 46 of the decorative layer. Different material 44 may be positioned at both short edges 46 of the decorative layer. Preferably a mechanical locking system is produced along the short edges of the decorative layer and in the core material of different material. A core material of different material 44, e.g. a piece of plywood, may also be positioned in the set at a position that is essentially in the middle of the decorative layer, or at any position where it may be desired to crosscut the building panel and provide the edge with a mechanical locking system.

Figure 5:
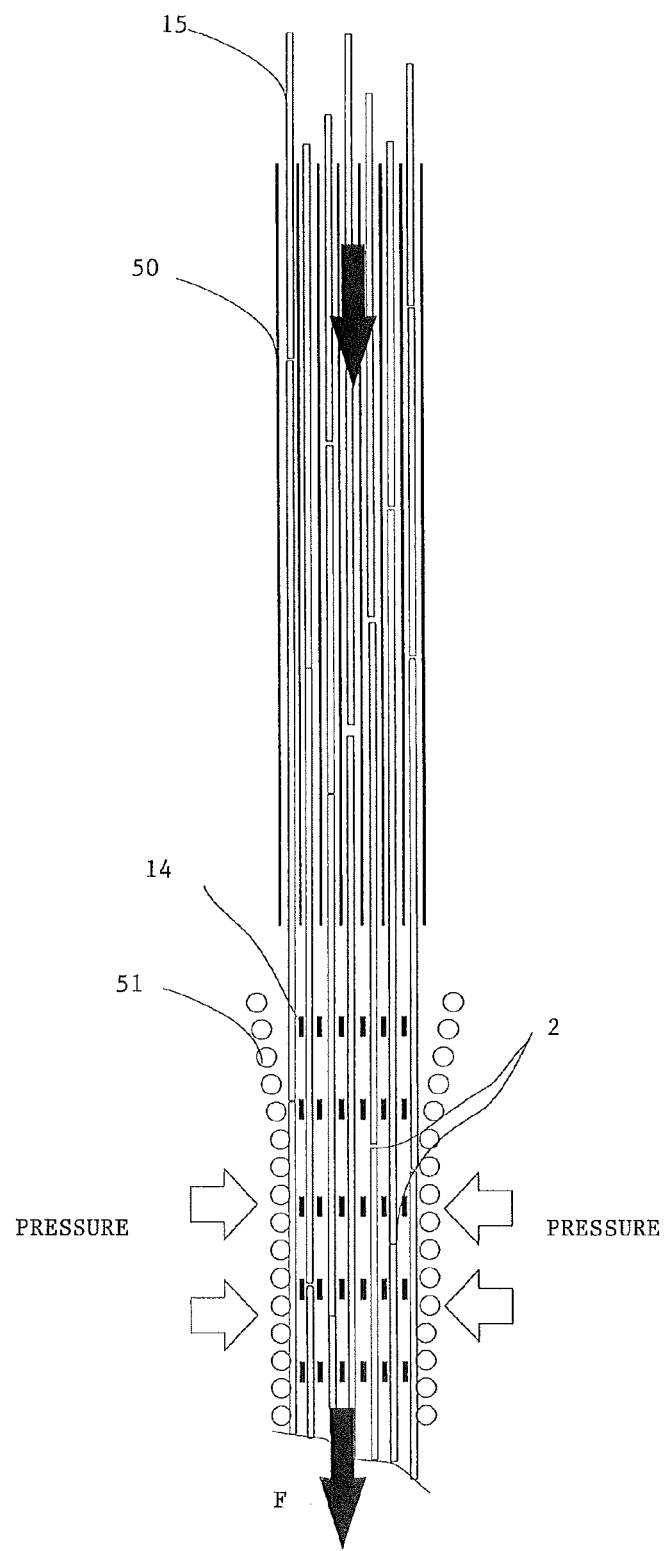
FIG. 5 illustrate a method of bonding wood boards and distance strips together according to an embodiment of the invention.

FIG. 5 shows an embodiment of arranging and fixing the wood boards 15 and the distance strips 14 to each other to obtain an endless batch. The wood boards 15 are continuously fed between several guiding means 50 positioned above each other. The wood boards are shown arranged above each other in a pile, but may also be arranged next to each other in a horizontal direction. The ends of the wood boards are positioned, in the longitudinal direction of the wood boards, in the batch at irregular positions, i.e. the ends are not arranged aligned. Distance strips 14 are positioned between the wood boards 15 and an adhesive, preferably a glue, such as resins, preferably cross-linked, hot melt glue, white glue or glue comprising polyvinyl acetate or polyurethane, is applied, and the wood boards are gradually pressed together by pressing devices 51. Wood boards 15, pre-cut to the same length, may also be used to create a batch with essentially the same length as the pre-cut wood boards.

Enforcement strips or elements may also be positioned at knots, weakness or between short edges of two adjacent wood boards that are fed after each other. A vision system, comprising e.g. a camera and a computer, may be used to position the enforcement strips and elements at the correct position.

Figure 6A:
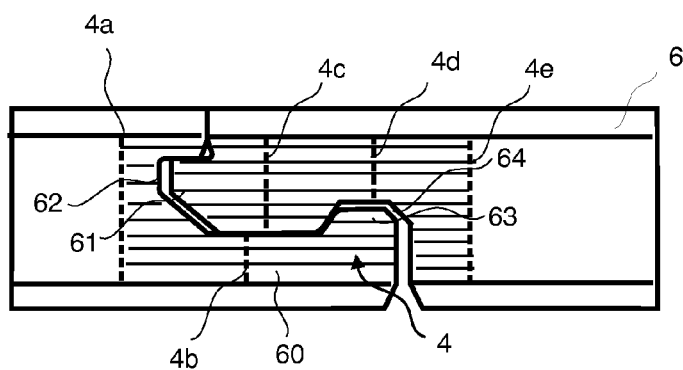
FIGS. 6a-c illustrate a locking system with a protruding strip comprising different sections according to an embodiment of the invention.
Figure 6B:
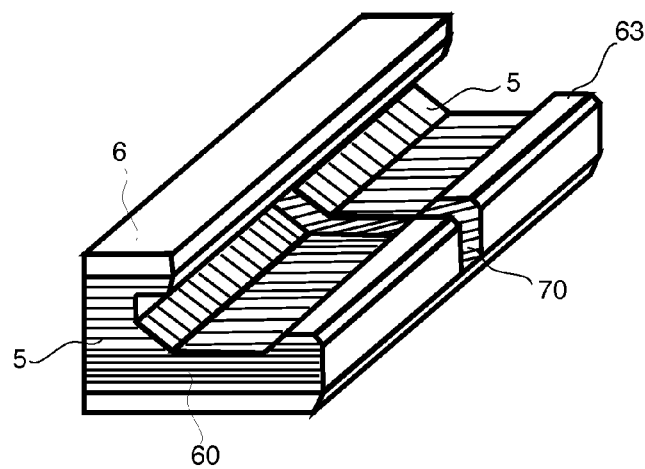
Figure 6C:
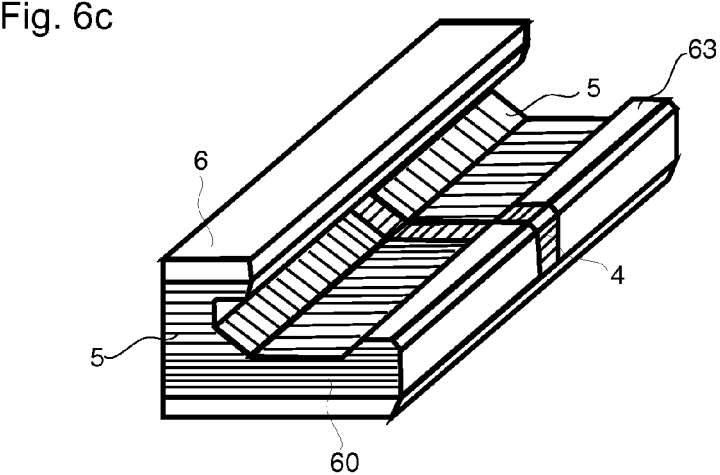

FIG. 6a-c show a building panel comprising a wood lamella core and a surface layer 6. A first wood lamella 5 is fixed to a second adjacent wood lamella by a distance element 4. The building panel is provided with a long edge locking system. The locking system comprises a first locking device at a first long edge and a second locking device at a second opposite long edge. The first locking device comprises a groove 62 and a protruding strip 60 with a locking element 63 at a first long edge. The second locking device comprises a locking groove 64 and tongue 61.

The first locking device is configured to cooperate with the second locking device at an essentially identical adjacent building panel. The tongue 61 and the groove 62 cooperate for vertical locking of the first and the second edge of said two essentially identical building panels. The locking element 63 and the locking groove 64 cooperate for horizontal locking of the first and the second edge of said two essentially identical building panels.

The distance element 4 at the first edge preferably extends to an inner position 4a such that it covers the essentially whole groove 62. The advantage is that there is no open space 70 at the edge and between the wood lamellas 5, see FIG. 6b, for accumulation of dust and splinters. Preferably the distance element 4 extends to an outer position at the outer edge of the locking element. This gives a strong locking and a more smooth machining since splitting of the locking element 63 at the outer edge of the wood lamella may be avoided, since the adjacent wood lamellas 5 are glued to the distance element 4 as shown in FIG. 6c.

The distance element 4 at the first edge may also extend to an outer position 4b such that only a part of the strip 60 is covered. The distance element 4 may also extend to an inner position such that an opening is created between adjacent wood lamellas.

The locking system is made even stronger vertically if the distance element 4 at the second edge extends to the outer end of the tongue and to an inner position 4c such that the distance element 4 covers the whole tongue 61. The horizontal strength is improved if the distance element at the second edge extends to an inner position 4d, such that the distance element covers a part of the locking groove 64, that cooperates with the locking element 63 for horizontal locking.

The distance element 4 at the second edge may also extend to an inner position 4e, such that the distance element covers essentially the whole locking groove 64, in order to avoid accumulation of dust and splinters.

A preferred locking system of the building panel comprises a locking strip 60, which comprises a first section, with a first wood fibre direction, and a second section with a second wood fibre direction. In the embodiments shown in FIG. 6a-c the first section is created by a wood lamella and the second section is created by the distance element.

A locking system of the building panel may further comprise a protruding strip 60 that comprises sections with different materials and/or widths along the joint.

Figure 7A:
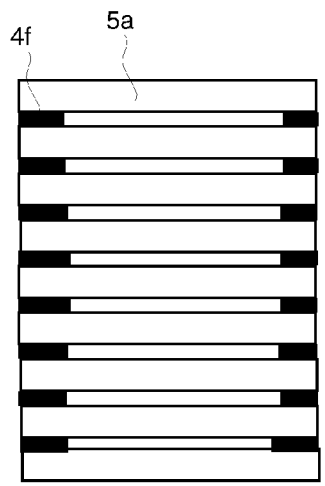
FIGS. 7a-f illustrate a multi-layer wood lamella core according to an embodiment of the invention.
Figure 7B:
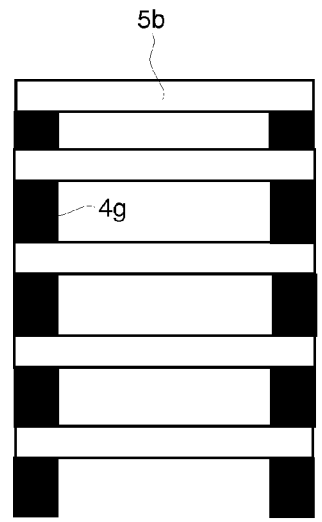
Figure 7C:
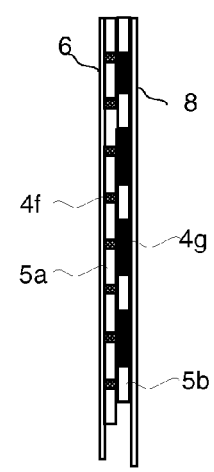
Figure 7D:
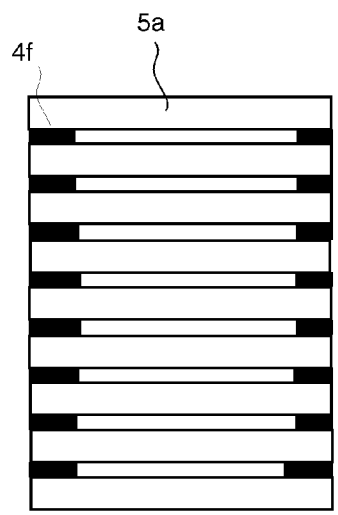
Figure 7E:
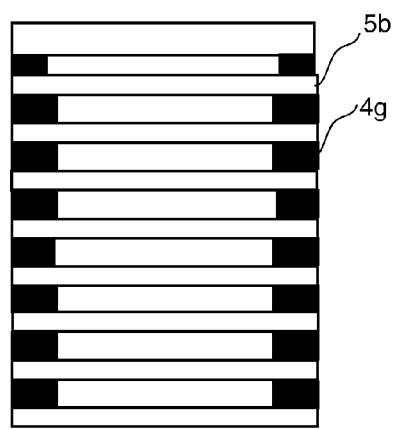
Figure 7F:
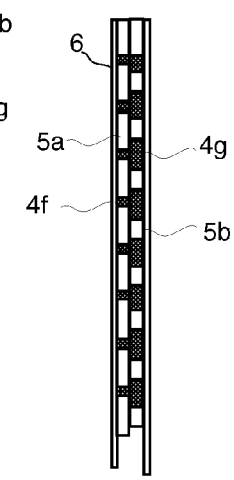

FIGS. 7a-7c show that further cost savings may be reached by forming a core comprising wood lamellas 5a, 5b with different widths and/or distance elements 4f, 4g with different width. The core comprises two sets of wood lamellas, an upper and a lower set. The average width of the distance elements 4g between the wood lamellas 5a in the lower set may be larger than the average width of the distance elements 4f between the wood lamellas 5b in the upper set. The average width of the wood lamellas 5b in the lower set may be smaller than the average width of the wood lamellas 5a in the upper set. A layer may be applied between the upper and the lower set, which is sound absorbing or thermally insulating.

It is possible to use more than two sets of wood lamellas and different materials may be used in the upper and lower wood lamellas and also in the same wood lamella set.

Such a multi-layer wood lamella core may provide considerable material savings. The weight of the panels may be reduced and this reduces the transport costs and makes installation easier, especially when the panels are of considerable length.

The space between the wood lamellas may be filled with different types of materials, preferably with materials that have a lower density than the wood material. This may be used to reduce sound and/or to change the sound frequency. The spaces between wood lamellas may also be used to include materials that have a better heat transmission than wood material to obtain an improved floor heating.

Figure 8A:
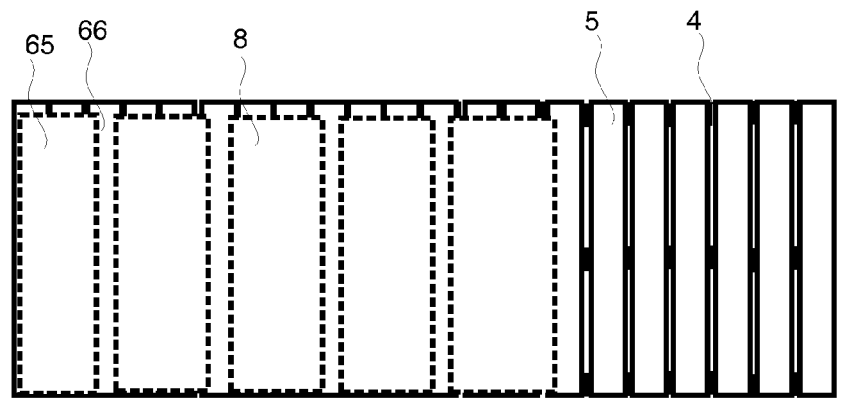
FIGS. 8a-d illustrate a balancing layer and a core comprising spaced apart sections according to embodiments of the invention.

FIG. 8a shows that cost savings may also be reached by modifying the balancing layer 8 on the rear side of a panel. The balancing layer in known multi-layer floor panels is generally a wood veneer that covers the whole rear side. It is according to the invention possible to glue several veneer strips 65 to the wood lamellas 5 with a distance 66 between the veneer strips 65. The precise positioning of the wood lamellas makes it possible to position the strips 65 such that they preferably always cover all spaces between the wood lamellas. The distance between the veneer strips may be increased if for example the wood lamellas that cover a space between adjacent veneer strips are preferably produced with a larger width than other wood lamellas. This means that the wood lamellas in the core may have different widths.

Figure 8B:
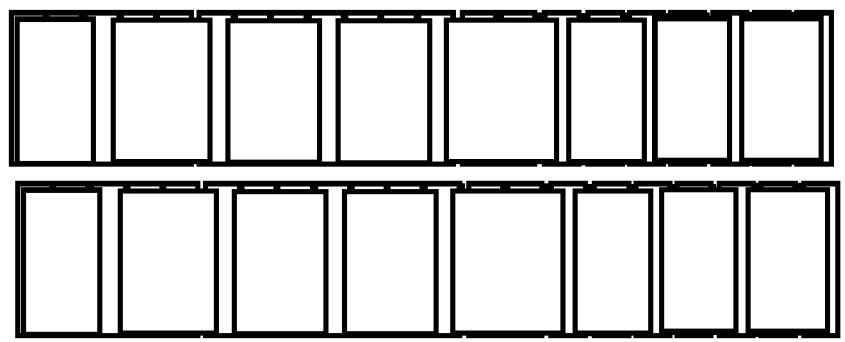

FIG. 8b show two panels that have been created by cutting the wood lamella core e.g. by sawing.

The method to form a balancing layer with separated materials, preferably with veneer strips as described above, may be combined with all other described embodiments.

The method to save material with several backing strips may also be used in panels with a conventional wood lamella core or in panels with a core comprising sheet material such as for example HDF, MDF or plywood.

The multi-layer core described above may also be used in panels where the core comprises HDF/MDF or plywood lamellas.

Figure 8C:
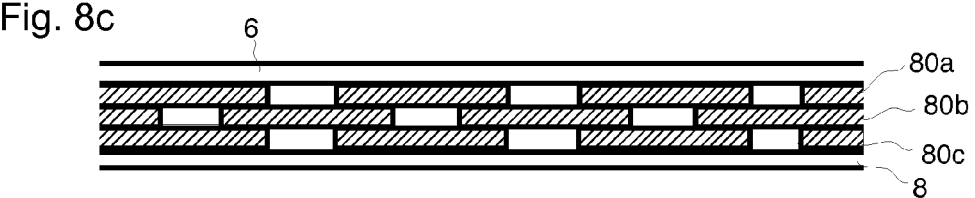

FIG. 8c shows a side view of a building panel, preferably a wood based floor panel, comprising a surface layer 6, a balancing layer 8 and a core that is formed by several layers of wood veneer strips 80a, 80b, and 80c connected to each other, preferably with glue. The veneer strips are spaced from each other. Distance elements are not needed in this embodiment, since a veneer may be cut with knives into veneer strips with well-defined widths which are positioned and glued side by side with intermediate well defined distances and in at least two layers one over the other. The fibre direction may be the same in all core layers. Distance elements may be used at edge portions of the final panel. This embodiment offers the advantages that no waste is caused by the knife cutting and that a large portion of the wood veneers may be used when a large veneer sheet is cut into smaller strips. Cost savings of more than 25% may be reached compared to for example a solid plywood core.

The wood veneer strips may be partly or completely replaced by strips formed from a sheet material for example HDF/MDF. Thin HDF is rather expensive. It is therefore preferred to use a thicker board that may be sliced into thinner material.

A preferred embodiment is a floor panel with a surface layer 6 with a thickness of about 1-3 mm, at least three layers of veneer strips (80*a*, 80*b*, 80*c*) with a thickness of about 1-3 mm and a width of about 20-30 mm, and a balancing layer with thickness of about 1-3 mm.

Figure 8D:
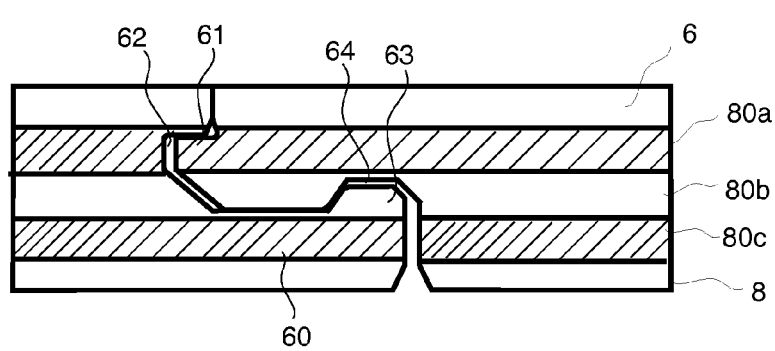

FIG. 8*d* shows a locking system formed in a core comprising three layers of veneer strips as shown in FIG. 8*c*. The locking strip 60 is preferably formed in the lower 80*c* and the middle layer 80*b*. The locking element 63 and the locking groove 64 are preferably formed in the same layer, preferably the middle layer 80*b*, to obtain a stronger locking.

Figure 9A:
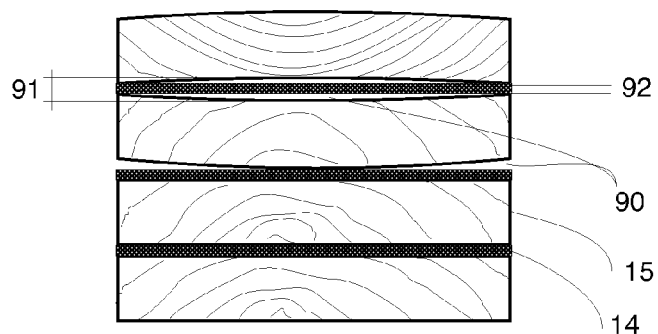
FIGS. 9a-d illustrate a batch and a wood board with a groove and a batch comprising such wood boards according to embodiments of the invention.
Figure 9B:
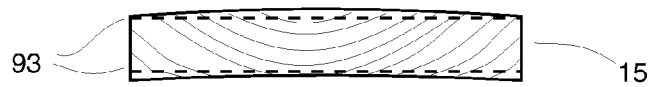
Figure 9C:
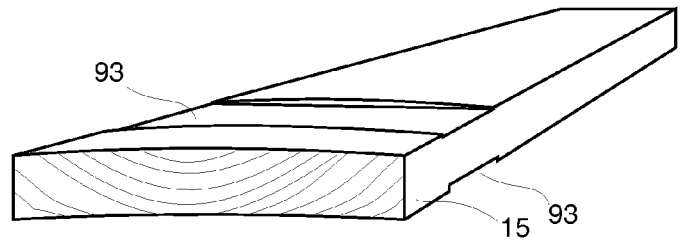
Figure 9D:
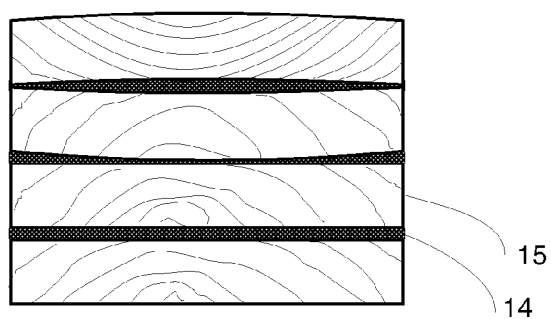

FIG. 9*a* shows a batch comprising cup shaped wood boards 15 and straight wood boards. The fixation strength between a distance strip 14 and a cup shaped wood boards is reduced since the distance 91, 92 between two adjacent wood boards varies over the width of the adjacent wood boards. The distance variation may also result in that the wood boards crack when the wood boards in the batch are pressed together after that glue is applied between the distance strips and the wood boards. To improve the fixation strength to a cup shaped wood board a groove 93, with a planar fixation surface, is formed in the surface of the wood board 15, as is shown in FIGS. 9*b,c*. The distance strip 14 is attached in the groove, preferably by gluing the distance strip to the fixation surface. FIG. 9*d* shows a batch with straight and cup shaped wood boards 15, which are provided with grooves 93 and distance strips 14 glued to the fixation surfaces of the grooves.

Figure 10A:
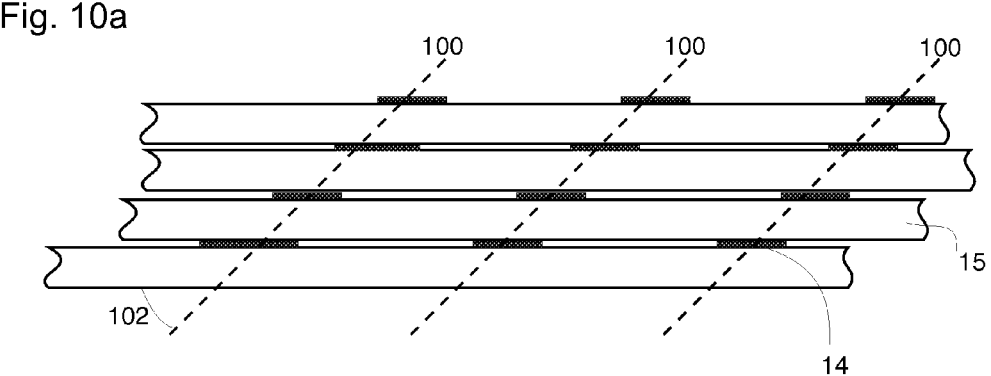
FIGS. 10a-b illustrate a batch of wood boards and distance strips and a semi product according to embodiments of the invention.

FIG. 10*a* shows a batch comprising piled wood boards 15 and distance strips 14 arranged between adjacent wood boards. The distance strips 14 between the wood boards are arranged in straight lines 100. The straight lines are oriented at an angle of about 45 degrees to the longitudinal direction of the wood boards. Each strip is glued to the adjacent wood boards.

Figure 10B:
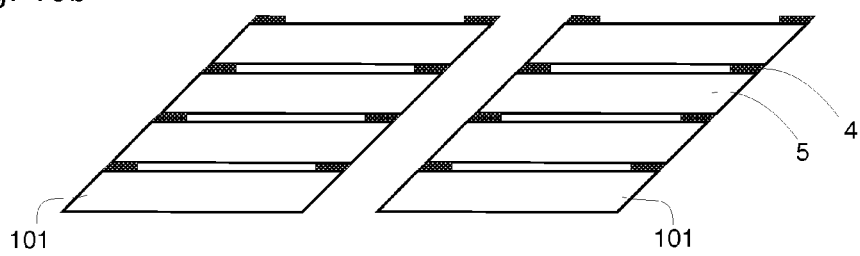
Figure 11A:
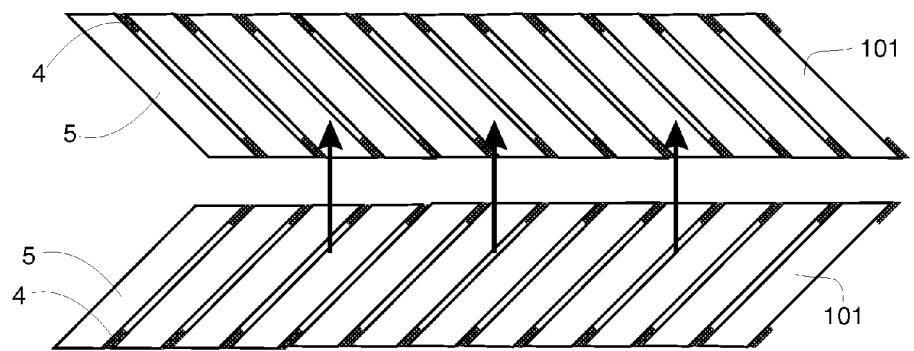
FIGS. 11a-b illustrates semi products and a beam according to embodiments of the invention.

A semi product 101 for a structural element, such as a beam, may be produced by dividing the batch along the longitudinal direction of the wood boards and cutting along the straight line 100. Two such semi products are shown in FIG. 10*b*. The wood boards are divided into wood lamellas 5 and the distance strips into distance elements 4. By turning one of the semi products, such that the lamellas of the two semi products are oriented perpendicular to each other and arranging them on each other, see FIG. 11*a*, a web for a structural element, such as a beam may be obtained, comprising a first layer comprising one of the two semi-products and a second layer comprising the other of the two semi products.

Figure 11B:
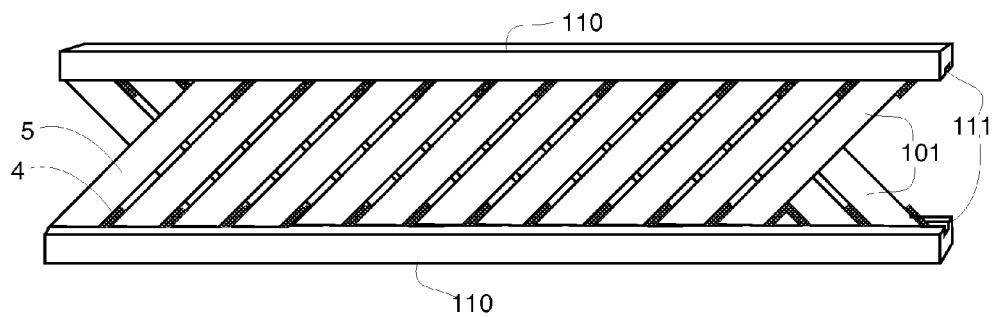

FIG. 11*b* shows a beam with a web comprising two semi products 101. The web comprises a first layer 101 comprising wood lamellas 5 and a second layer 102 comprising wood lamellas 5. The first layer is arranged such that the length direction of the wood lamellas is oriented essentially perpendicular to the length direction of the wood lamellas in the second layer.

A first wood lamella 5 in the first layer 101 is fixed to a second wood lamella in the first layer by a distance element 4.

A first wood lamella 5 in the second layer is fixed to a second wood lamella in the second layer 101 by a distance element 4.

The width of the distance element 4 may be larger than the width of the first wood lamella 5 and/or the width of the second wood lamella (not shown).

The first layer may be fixed to the second layer, preferably by gluing at some of the distance elements and/or at a crossing of lamellas of the first and the second layer. A first flange 111 is attached to ends of the wood lamellas in the first and a second layer, and a second flange 111 is attached to opposite end of the wood lamellas.

The web may comprise some wood lamellas which are oriented essentially perpendicular to the first and the second flange (not shown).

Embodiments

1. Building panel, such as a floorboard, comprising a wood lamella core, a decorative surface layer on top of the core and balancing layer under the core, the core comprises several wood lamellas, which are arranged essentially parallel to each other and with long edge to long edge, and a long edge of a first wood lamella is arranged with a distance to a long edge of an adjacent second wood lamella,
    wherein the long edge of the first wood lamella is fixed by a distance element to the long edge of the adjacent second wood lamella and at a first edge of the building panel,
    wherein a first mechanical locking device is formed at the first edge of the building panel and at least partly in the distance element.
2. The building panel as recited in embodiment 1, wherein the long edge of the first wood lamella is fixed by a second distance element to the long edge of the adjacent second wood lamella and at a second opposite edge of the building panel, wherein the distance element and the second distance element are arranged at a distance, preferably with a cavity in between.
3. The building panel as recited in embodiment 2, wherein a part of the distance element is positioned in a first groove in the first wood lamella, and a part of the second distance element is positioned in a second groove in the first wood lamella.
4. The building panel as recited in embodiment 3, wherein another part of the distance element and the second distance element are positioned in a third and a fourth groove, respectively, in the second wood lamella.
5. The building panel as recited in any one of embodiments 2-4, wherein a second mechanical locking device is formed at the second opposite edge of the building panel and at least partly in the second distance element.
6. The building panel as recited in embodiment 1, wherein the distance element extends to a second opposite edge of the building panel, wherein a second mechanical locking device is formed at the second opposite edge of the building panel and at least partly in the distance element.
7. The building panel as recited in embodiment 5 or 6, wherein the first mechanical locking device is configured to cooperate with the second mechanical locking device at an essentially identical building panel for vertical and/or horizontal locking of the building panel and the essentially identical building panel.
8. The building panel as recited in any one of the embodiments 5-6, wherein the second mechanical locking device comprises a locking groove at the second opposite edge of a groove panel.

9. The building panel as recited in any one of the preceding embodiments, wherein the first locking device comprises a protruding strip with a locking element.
10. The building panel as recited in embodiment 7, wherein the first locking device comprises a protruding strip with a locking element and the second locking device comprises a locking groove at the second adjacent edge, wherein the locking element and the locking groove are configured to cooperate for the locking in the horizontal direction.
11. The building panel as recited in embodiment 10 or 7, wherein one of the first or the second locking device comprises a tongue and the other of the first or the second locking device comprises a tongue groove, wherein the tongue and the tongue groove are configured to cooperate for the locking in the vertical direction.
12. The building panel as recited in any one of the preceding embodiments, wherein the distance element is of a different material or of different properties, e.g. different wood species and/or wood with different wood fibre directions, than the wood lamellas.
13. A semi-product for a structural element or for a core for a building panel, the semi product comprising several wood lamellas, which are arranged essentially parallel to each other and with long edge to long edge, a long edge of a first wood lamella is arranged with a distance to a long edge of an adjacent second wood lamella, and the long edge of the first wood lamella is fixed by a distance element, preferably at least two distance elements, to the long edge of the adjacent second wood lamella.
14. The semi-product according to embodiment 13, wherein the distance elements comprises wood fibres and is fixed to the first wood lamella and the adjacent second wood lamella by an adhesive, such as resins, preferably cross-linked, hot melt glue, white glue or glue comprising polyvinyl acetate or polyurethane.
15. The semi-product as recited in embodiment 13, wherein the distance between the long edge of the first wood lamella and the long edge of the adjacent second wood lamella in the core for the building panel is in the range of about 0.5 mm to about 15 mm, preferably in the range of about 1 mm to about 5 mm.
16. The semi-product as recited in any one of the embodiments 13-15, wherein the first or the second wood lamella comprises, in its length direction, two pieces spaced from each other by a space at short edges of said pieces.
17. The semi-product as recited in any one of the embodiments 13-16, wherein the distance element is positioned at a short edge of the first and the second wood lamella.
18. The semi-product as recited in any one of the embodiments 13-17, wherein an enforcement element is arranged at the space or at a knot or other weakness of the wood lamella.
19. The semi-product as recited in any one of the embodiments 13-18, wherein an outer long edge of the outermost wood lamella is provided with distance elements.
20. The semi-product as recited in any of the embodiments 13-19, wherein a part of the distance element is positioned in a groove in the first wood lamella.
21. The semi-product as recited in any of the embodiments 13-20, wherein another part of the distance element is positioned in another groove in the second wood lamella.
22. The semi-product as recited in any of the embodiments 13-21, wherein a third wood lamella is fixed to second wood lamella by a second distance element, a fourth wood lamella is fixed to the third wood lamella by a third distance element, wherein the distance element, the second distance element and the third distance element are arranged in a straight line.
23. The semi-product as recited in embodiment 22, wherein the straight line is oriented at about 45 degrees to the longitudinal direction of the first wood lamella.
24. Method of producing a semi-product for a structural element, preferably according to any one of the embodiments 31-36, or for a core for a building panel according to any one of the embodiments 13-23, wherein the method comprises the step of:
    attaching at least two distance strips, preferably with a distance essentially equal to the width of the building panel, by an adhesive to a first wood board, the strips are preferably arranged essentially perpendicular to the first wood board;
    attaching a second wood board to the distance strips by an adhesive; and
    cutting the first and the second wood boards and the distance strips in the length direction of the wood boards, preferably by a multi rip saw, a frame saw or a band saw.
25. The method as recited in embodiment 24, wherein the method comprises the step of attaching several wood boards and distance strips to the second and or first wood board and preferably at least two distance strips between adjacent wood boards.
26. The method as recited in embodiment 25, wherein the method comprises the step of arranging the distance strips between adjacent wood boards in a straight line.
27. The method as recited in embodiment 26, wherein the straight line is oriented at about 45 degrees to the longitudinal direction of the first wood board.
28. The method as recited in embodiment 26, wherein the straight line is oriented at about 90 degrees to the longitudinal direction of the first wood board.
29. The method as recited in any one of the embodiments 24-28, wherein the method comprises the step of cutting the first and the second wood boards and the distance strips in the length direction several (e.g., at least two) times with a distance between the cuts which is equal to the thickness of the semi-product.
30. The method as recited in embodiment 29, wherein the method comprises the step of cutting the first and the second wood boards and the distance strips in a direction perpendicular to the length direction.
31. The method as recited in any one of the embodiments 24-30, wherein the method comprises the steps of:
    forming two grooves in a surface of the first wood board; and
    attaching one of said two distance strips in each groove.
32. The method as recited in embodiment 31, wherein the method comprises the steps of:
    forming two grooves in a surface of the second wood board; and
    attaching one of said two distance strips in each of said grooves in the surface of the second wood board.
33. A structural element, such as a beam, comprising a web of wood, the web comprising a first layer comprising wood lamellas and a second layer comprising wood lamellas, wherein the first layer is arranged such that the length direction of at least some of the wood lamellas is oriented essentially perpendicular to the length direction of at least some of the wood lamellas in the second layer.
34. The structural element as recited in embodiment 33, wherein a first wood lamella in the first layer is fixed to a second wood lamella in the first layer by a distance element.

35. The structural element as recited in embodiment 33 or 34, wherein a first wood lamella in the second layer is fixed to a second wood lamella in the second layer by a distance element.
36. The structural element as recited in embodiment 34 or 35, wherein the width of the distance element is larger than the width of the first wood lamella and/or the width of the second wood lamella.
37. The structural element as recited in any one of the embodiments 33-36, wherein the first layer is fixed to the second layer, preferably by gluing at some of the distance elements and/or at a crossing of the first and the second layer.
38. The structural element as recited in any one of the embodiments 33-37, wherein the structural member is a beam, wherein a first flange is attached to ends of the wood lamellas in the first and a second layer, and a second flange is attached to opposite end of the wood lamellas.

The invention claimed is:

1. A building panel comprising a wood lamella core, a decorative surface layer on top of the core and balancing layer under the core, the core comprising several wood lamellas, which are stacked essentially parallel to each other in a stack, so that each of the wood lamellas in the stack extends in the same direction, and with long edge to long edge, and a long edge of a first wood lamella is arranged with a distance to a long edge of an adjacent second wood lamella in the stack,
   wherein the long edge of the first wood lamella is fixed by at least two distance elements to the long edge of the adjacent second wood lamella and at a first edge of the building panel, and
   wherein a first mechanical locking device is formed at the first edge of the building panel and at least partly in at least one of the distance elements.

2. The building panel as claimed in claim 1, wherein the long edge of the first wood lamella is fixed by a second distance element of the at least two distance elements to the long edge of the adjacent second wood lamella and at a second opposite edge of the building panel, wherein a first distance element of the at least two distance elements and the second distance element are arranged at a distance from each other.

3. The building panel as claimed in claim 2, wherein a part of the first distance element is positioned in a first groove in the first wood lamella, and a part of the second distance element is positioned in a second groove in the first wood lamella.

4. The building panel as claimed in claim 3, wherein another part of the first distance element and the second distance element are positioned in a third and a fourth groove, respectively, in the second wood lamella.

5. The building panel as claimed in claim 2, wherein a second mechanical locking device is formed at the second opposite edge of the building panel and at least partly in the second distance element.

6. The building panel as claimed in claim 5, wherein the first mechanical locking device is configured to cooperate with the second mechanical locking device at an essentially identical building panel for vertical and/or horizontal locking of the building panel and the essentially identical building panel.

7. The building panel as claimed in claim 6, wherein the first mechanical locking device comprises a protruding strip with a locking element and the second mechanical locking device comprises a locking groove at the second adjacent edge, wherein the locking element and the locking groove are configured to cooperate for the locking in the horizontal direction.

8. The building panel as claimed in claim 6, wherein one of the first or the second mechanical locking device comprises a tongue and the other of the first or the second mechanical locking device comprises a tongue groove, wherein the tongue and the tongue groove are configured to cooperate for the locking in the vertical direction.

9. The building panel as claimed in claim 5, wherein the second mechanical locking device comprises a locking groove at the second opposite edge of the building panel.

10. The building panel as claimed in claim 1, wherein at least one of the distance elements extends to a second opposite edge of the building panel, wherein a second mechanical locking device is formed at the second opposite edge of the building panel and at least partly in the at least one distance element.

11. The building panel as claimed in claim 1, wherein the first mechanical locking device comprises a protruding strip with a locking element.

12. The building panel as claimed in claim 1, wherein the at least two distance elements are of a different material or of different properties than the wood lamellas.

13. The building panel as claimed in claim 1, wherein at least one of the distance elements extends to an opposite long edge of the first wood lamella.

14. A semi-product for a structural element or for a core for a building panel, the semi product comprising several wood lamellas, which are stacked essentially parallel to each other in a stack, so that each of the wood lamellas in the stack extends in the same direction, and with long edge to long edge, a long edge of a first wood lamella is arranged with a distance to a long edge of an adjacent second wood lamella in the stack, and the long edge of the first wood lamella is fixed by at least two distance elements to the long edge of the adjacent second wood lamella,
   wherein at least one of the distance elements is positioned at a short edge of the first and the second wood lamella.

15. The semi-product according to claim 14, wherein the distance elements comprise wood fibres and are fixed to the first wood lamella and the adjacent second wood lamella by adhesive.

16. The semi-product as claimed in claim 14, wherein the distance between the long edge of the first wood lamella and the long edge of the adjacent second wood lamella in the core for the building panel is in the range of about 0.5 mm to about 15 mm.

17. The semi-product as claimed in claim 14, wherein the first or the second wood lamella comprises, in its length direction, two pieces spaced from each other by a space at short edges of said pieces.

18. The semi-product as claimed in claim 17, wherein an enforcement element is arranged at the space or at a knot or other weakness of the first or the second wood lamella.

19. The semi-product as claimed in claim 14, wherein an outer long edge of an outermost wood lamella is provided with distance elements.

20. The semi-product as claimed in claim 14, wherein a part of at least one of the distance elements is positioned in a groove in the first wood lamella.

21. The semi-product as claimed in claim 20, wherein another part of the at least one distance element is positioned in another groove in the second wood lamella.

22. The semi-product according to claim 14, wherein at least one of the distance elements extends to an opposite long edge of the first wood lamella.

23. A semi-product for a structural element or for a core for a building panel, the semi product comprising several wood lamellas, which are stacked essentially parallel to each other in a stack, so that each of the wood lamellas in the stack extends in the same direction, and with long edge to long edge, a long edge of a first wood lamella is arranged with a distance to a long edge of an adjacent second wood lamella in the stack, and the long edge of the first wood lamella is fixed by at least two distance elements to the long edge of the adjacent second wood lamella, wherein a third wood lamella is fixed to the second wood lamella by a third distance element, a fourth wood lamella is fixed to the third wood lamella by a fourth distance element, wherein one of the at least two distance elements, the third distance element and the fourth distance element are arranged in a straight line.

24. The semi-product as claimed in claim 23, wherein the straight line is oriented at about 45 degrees to the longitudinal direction of the first wood lamella.

* * * * *